(12) United States Patent
Tohyama et al.

(10) Patent No.: US 10,167,439 B2
(45) Date of Patent: Jan. 1, 2019

(54) ULTRAVIOLET CURABLE RESIN COMPOSITION AND SLIDING MEMBER

(71) Applicant: MINEBEA MITSUMI INC., Kitasaku-gun, Nagano (JP)

(72) Inventors: Hirotaka Tohyama, Kitasaku-gun (JP); Tadahiko Karaki, Tomi (JP); Yuko Taguchi, Otake (JP); Kentaro Ishikawa, Saku (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 0 days.

(21) Appl. No.: 15/609,794

(22) Filed: May 31, 2017

(65) Prior Publication Data

US 2017/0349851 A1  Dec. 7, 2017

(30) Foreign Application Priority Data

Jun. 1, 2016 (JP) .................................. 2016-110185
Jan. 31, 2017 (JP) .................................. 2017-015115

(51) Int. Cl.
*C09D 127/18* (2006.01)
*C08F 259/08* (2006.01)
(Continued)

(52) U.S. Cl.
CPC ......... *C10M 107/38* (2013.01); *C08F 259/08* (2013.01); *C08L 27/18* (2013.01); *C08L 35/02* (2013.01); *C09D 4/06* (2013.01); *F16C 11/0614* (2013.01); *F16C 23/045* (2013.01); *F16C 33/1095* (2013.01); *F16C 33/201* (2013.01); *F16C 33/208* (2013.01);
(Continued)

(58) Field of Classification Search
CPC ........ C10M 107/38; C10M 2213/0623; C10N 2240/02; C10N 2250/18; F16C 11/0614; F16C 23/045; F16C 33/201; F16C 33/208; F16C 33/1095; F16C 2208/32; F16C 2223/60; F16C 2226/62; F16C 2326/43; C08F 259/08; C09D 4/06; C08L 27/18; C08L 35/02
See application file for complete search history.

(56) References Cited

U.S. PATENT DOCUMENTS 5,863,875 A * 1/1999 Steckel ................ C09D 167/00
508/551
2003/0104955 A1* 6/2003 Yuki .................... C10M 145/14
508/469

(Continued)

FOREIGN PATENT DOCUMENTS

JP   2007-255712 A   10/2007
JP   2014-74082 A    4/2014
WO  2013/161402 A1  10/2013

OTHER PUBLICATIONS

Aug. 28, 2017 Search Report issued in European Patent Application No. 17174008.7.

*Primary Examiner* — James C Goloboy
(74) *Attorney, Agent, or Firm* — Oliff PLC (57) ABSTRACT

There is provided an ultraviolet curable resin composition for a self-lubricating liner, including: a (meth)acrylate compound having an isocyanuric acid ring; at least one of (meth)acrylate having a phosphoric acid ester group and (meth)acrylate having a silane group: a polythiol compound; and a polytetrafluoroethylene resin as a solid lubricant.

20 Claims, 2 Drawing Sheets

(51) Int. Cl.
| | |
|---|---|
| *C08F 230/08* | (2006.01) |
| *C08F 230/02* | (2006.01) |
| *C08F 220/32* | (2006.01) |
| *C08F 222/10* | (2006.01) |
| *C08F 220/20* | (2006.01) |
| *C08L 35/02* | (2006.01) |
| *C08L 33/14* | (2006.01) |
| *C08L 27/18* | (2006.01) |
| *C09D 4/06* | (2006.01) |
| *C08K 7/14* | (2006.01) |
| *C10M 107/38* | (2006.01) |
| *F16C 33/10* | (2006.01) |
| *F16C 33/20* | (2006.01) |
| *F16C 11/06* | (2006.01) |
| *F16C 23/04* | (2006.01) |

(52) U.S. Cl.
CPC . *C10M 2213/0623* (2013.01); *C10N 2240/02* (2013.01); *C10N 2250/18* (2013.01); *F16C 2208/32* (2013.01); *F16C 2223/60* (2013.01); *F16C 2226/62* (2013.01); *F16C 2326/43* (2013.01)

(56) References Cited

U.S. PATENT DOCUMENTS

| | | | |
|---|---|---|---|
| 2007/0223850 A1 | 9/2007 | Lopes et al. | |
| 2010/0035053 A1* | 2/2010 | Kishi | C08F 290/06 428/336 |
| 2011/0104389 A1 | 5/2011 | Bryan-Brown et al. | |
| 2014/0000640 A1* | 1/2014 | Janda | A61Q 3/02 132/200 |
| 2014/0171347 A1* | 6/2014 | Kohama | A61L 29/041 508/100 |
| 2015/0051123 A1* | 2/2015 | Karaki | C08F 114/26 508/106 |
| 2015/0275125 A1 | 10/2015 | Karaki et al. | |
| 2017/0015923 A1 | 1/2017 | Karaki et al. | |

\* cited by examiner

ULTRAVIOLET CURABLE RESIN COMPOSITION AND SLIDING MEMBER

CROSS REFERENCE TO RELATED APPLICATION

This application claims the benefit of priority of Japanese Patent Applications No. 2016-110185 filed on Jun. 1, 2016 and No. 2017-015115 filed on Jan. 31, 2017. The contents of Japanese Patent Applications No. 2016-110185 and No. 2017-015115 are incorporated herein by reference in their entities.

BACKGROUND

Field of the Invention

The present disclosure relates to an ultraviolet curable resin composition for forming a self-lubricating liner of a sliding member and a sliding member provided with the self-lubricating liner.

Description of the Related Art

A sliding bearing in which a shaft of rotary motion or translational motion is held by a sliding surface has been widely used. In particular, an unlubricated sliding bearing using no lubricating oil for a sliding surface has been used for applications requiring low friction coefficient, high durability, high load capacity, high heat resistance, high oil resistance, and the like, such as vessel or ship application and aircraft application.

As the unlubricated sliding bearing, Japanese Patent Application Laid-open No. 2007-255712 discloses a spherical bearing for high-load application that includes an outer race member having a concave first bearing surface and an inner race member having a convex second bearing surface slidably movable relative to the first bearing surface. In the spherical bearing, one of the outer race member and the inner race member is made of titanium alloy which has a bearing surface made of titanium nitride formed on the titanium alloy surface by a physical vapor deposition method (PVD). The bearing surface of the other member includes a self-lubricating liner made from resin. The self-lubricating liner is composed of a fabric including fibers of polytetrafluoroethylene (PTFE) and polyaramid. The fabric is saturated with a phenol resin composition.

International Publication No. WO2013/161402 filed by the applicant of the present application discloses a curable resin composition containing 20 to 90% by weight of a (meth)acrylate compound having an isocyanuric acid ring and 10 to 50% by weight of polytetrafluoroethylene resin. It is described that a self-lubricating liner may be formed from this resin composition on a sliding surface of a sliding bearing, and that the sliding bearing with such a self-lubricating liner is suitable for aircraft application and the like.

Since the unlubricated sliding bearing disclosed in International Publication No. WO2013/161402 is used by being assembled in an aircraft and the like, it has low friction coefficient, high load capacity, heat resistance and oil resistance. In spite of that such an unlubricated sliding bearing is still required to increase the thickness of the self-lubricating liner. Further, the unlubricated sliding bearing is required to increase the amount of PTFE added to the self-lubricating liner in order to reduce friction and improve wear resistance of the self-lubricating liner. Furthermore, the self-lubricating liner is required to have a good adhesiveness in relation to an inner circumferential surface of a metal outer race member.

Japanese Patent Application Laid-open No. 2014-74082 discloses a photocurable resin composition made from a polythiol compound, a photoradical initiator, and a compound containing an isocyanuric acid ring and (meth)acrylic group.

The present disclosure has been conceived to solve the foregoing problems. Art object related to the present disclosure is to provide a resin composition for forming a self-lubricating liner having increased thickness, improved lubricity, and a good adhesion property to metal. Another object related to the present disclosure is to provide a sliding member with the self-lubricating liner made from the resin composition.

SUMMARY

According to a first aspect related to the present disclosure, there is provided an ultraviolet curable resin composition for a self-lubricating liner, comprising:

a (meth)acrylate compound having an isocyanuric acid ring represented by formula (1):

where X is a group that contains an acryloyl group and is composed only of C, H, and O, and Y and Z are groups each composed only of C, H, and O;

at least one of (meth)acrylate having a phosphoric acid ester group and (meth)acrylate having a silane group;

polythiol compound; and a polytetrafluoroethylene resin as a solid lubricant.

According to a second aspect of the present disclosure, there is provided a sliding member comprising a self-lubricating liner which is formed on a sliding surface of the sliding member and is made of the ultraviolet curable resin composition related to the first aspect.

DESCRIPTION OF THE EMBODIMENTS

In the following, an explanation will be made about an ultraviolet curable resin composition related to the present disclosure and a sliding member with a self-lubricating liner made from the ultraviolet curable resin composition.

<Sliding Member>

At first, an exemplary sliding member including the self-lubricating liner made from the ultraviolet curable resin composition related to the present disclosure will be explained while referring to FIGS. 1A and 1B. A sleeve bearing 10 shown in FIGS. 1A and 1B includes a cylindrical outer race member 12 which is made of metal such as bearing steel, stainless steel, duralumin material, and titanium alloy and a self-lubricating liner layer 14 which is formed on an inner circumferential surface of the outer race member 12. The self-lubricating liner layer 14 is a self-lubricating resin layer and is formed by applying the ultraviolet curable resin composition related to the present disclosure which will be described below on the inner circumferential surface of the outer race member 12 and then curing the applied ultraviolet curable resin composition. The size adjustment of self-lubricating liner can be easily performed by grinding or cutting, and thus the self-lubricating liner may be referred to as a "machinable liner" (processable liner) as appropriate. The sliding member may be any member having at least a sliding surface. Thus, the sliding member includes not only a sleeve bearing used for rotary motion or translational (linear) motion but also various sliding members such as a spherical bearing and a reamer bolt which will be described later. Those sliding members are also included in an object related to the present disclosure.

<Ultraviolet Curable Resin Composition>

The ultraviolet curable resin composition contains (meth)acrylate having an isocyanuric acid ring represented by the following formula (1) as a component mainly composing the resin.

(1)

In the formula (1), X is a group which contains an acryloyl group and is composed only of C, H, and O. Y and Z are groups each composed only of C, H, and O. Y and Z may or may not contain the acryloyl group. X is preferably an acryloxyethyl group or an acryloxyethyl group modified by ε-caprolactone. Y and Z are preferably the same group as X. In the present application, the term "(meth)acrylate" means acrylate or methacrylate.

The (meth)acrylate having the isocyanuric acid ring represented by formula (1) (hereinafter simply referred to as (meth)acrylate having the isocyanuric acid ring) has satisfactory heat resistance in addition to the ultraviolet curing property, and thus it is preferably used for a self-lubricating liner of sliding members and the like. In particular, the sliding member incorporated into the aircraft is required to have a heat resistance of 163 degrees C. or more, and even in such a case, the (meth)acrylate having the isocyanuric acid ring is preferably used.

The (meth)acrylate having the isocyanuric acid ring is preferably capable of being applied on a sliding surface as a composition and is preferably capable of forming a self-lubricating liner with reduced wear after curing. From this viewpoint, as the (meth)acrylate having the isocyanuric acid ring, bis(acryloyloxyethyl) hydroxyethyl isocyanurate, di-(2-(meth) acryloxyethyl) isocyanurate, tris-(2-(meth)acryloxyethyl) isocyanurate, ε-caprolactone modified tris-(2-acryloxyethyl) isocyanurate, and the like art preferably used. The above examples of the (meth)acrylate having the isocyanuric acid ring may be used individually or combining two or more kinds. Especially, any of di-(2-(meth) acryloxyethyl) isocyanurate, tris-(2-(meth)acryloxyethyl) isocyanurate, and ε-caprolactone modified tris-(2-acryloxyethyl) isocyanurate is preferably used, or a mixture of di-(2-(meth) acryloxyethyl) isocyanurate and tris-(2-(meth)acryloxyethyl) isocyanurate is preferably used.

The resin composition related to the present disclosure may contain the (meth)acrylate having the isocyanuric acid ring in an amount of 15 to 50% by weight, 15 to 40% by weight, or especially 16 to 35% by weight. When the content of the (meth)acrylate, having the isocyanuric acid ring is less than 15% by weight, resin fluidity is liable to be insufficient, which could make the application of the resin composition difficult, and further strength of the liner is liable to be inadequate. When the content of the (meth)acrylate having the isocyanuric acid ring exceeds 50% by weight, the lubricating property tends to decrease due to a low content of a solid lubricant described later.

The ultraviolet curable resin composition contains, as an adhesion improver to metal, (meth)acrylate having a phosphoric acid ester group and (methacrylate having a silane group individually or in combination. As the (meth)acrylate having the phosphoric acid ester group, ethylene glycol methacrylate phosphate represented by the following formula (2), phosphoric acid 2-(acryloyloxy)ethyl, and the like may be used individually or combining two more kinds. As the (meth)acrylate having the silane group, 3-acryloxypropyltrimethoxysilane represented by the following formula (3), 3-methacryloxypropylmethyldimethoxysilane, 3-methacryloxypropyltrimethoxysilane, 3-methacryloxypropylmethyldimethoxysilane, 3-methacryloxypropyltrimethoxysilane, and the like may be used individually or combining two more kinds. The resin composition may contain the (meth)acrylate having the phosphoric acid ester group and/or the (meth)acrylate having the silane group in an amount of 1 to 10% by weight, especially in an amount of 1 to 5% by weight. When the content of the (meth)acrylate having the phosphoric acid ester group and/or the (meth)acrylate having the silane group is less than 1% by weight, the adhesion improving effect is liable to be insufficient. When the content of the (meth)acrylate having the phosphoric acid ester group and/or the (meth)acrylate having the silane group exceeds 10% by weight, the lubricating property is liable to decrease due to a low content of the solid lubricant.

(2)

The ultraviolet curable resin composition may contain, as a viscosity modifier, (meth)acrylate having a hydroxy group. As the (meth)acrylate having, the hydroxy group, hydroxyethyl methacrylate represented by the following formula (4), hydroxyethyl acrylate, hydroxypropyl (meth)acrylate, and the like may be used individually or combining two or more kinds. The resin composition may contain 1 to 20% by weight of the (meth)acrylate having the hydroxy group.

The ultraviolet curable resin composition contains, as a curing reaction accelerator (polymerization reaction accelerator), a polythiol compound. The polythiol compound reacts with (meth)acrylate due to both ultraviolet rays and heat. When the resin composition is irradiated with ultraviolet rays, the polythiol compound reacts with the (meth)acrylate and generates reaction heat. The reaction between the polythiol and the (meth)acrylate is accelerated by this reaction heat. Thus, even when the thickness of the ultraviolet curable resin composition is large and ultraviolet rays do not reach the inner portion of the resin composition due to absorption of ultraviolet rays at the surface of the resin composition, the reaction heat generated by the reaction on the surface of the resin composition allows the reaction to continue until the inner portion of the resin composition. Accordingly, even when the thickness of the ultraviolet curable resin composition is large, the inner portion of the resin composition can be cured by the ultraviolet irradiation, and also the content of PTFE in the resin composition can be increased. Moreover the ultraviolet curable resin composition containing the polythiol compound prevents cracks caused by the contraction of the resin composition upon curing. The polythiol compound is exemplified, for example, by trimethylolpropane tris(3-mercapto propionate), pentaerythritol tetrakis(3-mercapto propionate), trimethylolpropane tris(3-mercapto butyrate), trimethylolethane tris(3-mercapto butyrate), ethylene glycol bis(3-mercapto glycolate), butanediol bis(3-mercapto glycolate), trimethylolpropane tris(3-mercapto glycolate), pentaerythritol tetrakis(3-mercapto glycolate), tris-[(3-mercapto propionyloxy)-ethyl]-isocyanurate, tetraethylene glycol bis(3-mercapto propionate), dipentaerythritol hexakis(3-mercapto propionate), pentaerythritol tetrakis(3-mercapto butyrate), 1,4-bis(3-mercaptobutyryloxy)butane, and 1,3,5-tris(3-mercaptobutyryloxyethyl)-1,3,5-triazine-2,4,6(1H, 3H, 5H)-trione. The above-listed compounds may be used individually or combining two or more kinds. The polythiol compound may be a commercially available product, and examples of the commercially available product include: "TMTP" and "PETP" produced by YODO KAGAKU CO., LTD.; "TEMPIC", "TMMP", "PEMP", "PEMP-II20P", and "DPMP" produced by SC Organic Chemical Co., Ltd.; "MTNR1", "MTBD1", and "MTPE1" produced by SHOWA DENKO K.K. The commercial available products usable as the polythiol compound are not limited to those. The resin composition related to the present disclosure may contain 0.5 to 5% by weight of the polythiol compound. When the content of the polythiol compound is less than 0.5% by weight, the curing reaction accelerating effect is liable to be insufficient. When the content of the polythiol compound exceeds 5% by weight, the lubricating property is liable to decrease due to a low content of the solid lubricant.

The ultraviolet curable resin composition may contain, as the curing reaction accelerator, a compound having a glycidyl group or oxetane group and an acrylic group. A compound having the glycidyl group or oxetane group reacts with a thiol group by heat. A compound having the acrylic group is cured by ultraviolet irradiation. Thus, when the ultraviolet curable resin composition contains the compound having the glycidyl group or oxetane group and the acrylic group, the ultraviolet irradiation causes the curing reaction due to the acrylic group and the reaction heat generated by the curing reaction causes the reaction between the glycidyl group or oxetane group and the thiol group. Thus, even when the thickness of die ultraviolet curable resin composition is large, the inner portion of the resin composition can be completely cured by the ultraviolet rays irradiation, and also the content of PTFE in the resin composition can be increased. As such a compound, it is possible to use glycidyl methacrylate represented by the following formula (5), (3-ethyloxetane-3-yl) methyl methacrylate, and the like. The resin composition may contain the compound having the glycidyl group or oxetane group and the acrylic group in an amount of 1 to 20% by weight, especially in an amount of 4 to 10% by weight. When the content of the compound is less than 1% by weight, the curing reaction accelerating effect is insufficient. When the content of the compound exceeds 20% by weight, the lubricating property tends to decrease due to a low content of the solid lubricant.

In order to accelerate curing speed without losing strength and heat resistance after curing, the ultraviolet curable resin composition may contain, as a curing accelerator, a bifunctional or higher (meth)acrylate monomer (i.e., (meth)acrylate monomer having three or more of (meth)acrylic groups). In particular, the ultraviolet curable resin composition may contain pentaerythritol triacrylate, pentaerythritol tetraacrylate, dipentaerythritol penta(meth)acrylate, dipentaerythritol hexa(meth)acrylate, dipentaerythritol polyacrylate, and trimethylolpropane tri(meth)acrylate individually or combining two or more kinds. The ultraviolet curable resin composition containing the trifunctional or higher (meth) acrylate monomer has many starting points of polymerization reaction, thus making the polymerization reaction (curing reaction) faster. Further, the ultraviolet curable resin composition containing the trifunctional or higher (meth) acrylate monomer has many cross-linking points, thus improving heat resistance of the cured resin. The content of the trifunctional or higher (meth)acrylate monomer may be 15% by weight or less. When the content of the trifunctional or higher (meth)acrylate monomer exceeds 15% by weight, the resin composition cures so rapidly that it becomes difficult to handle the resin composition at the time of manufacture.

In order to provide chemical resistance without losing, strength after curing, the ultraviolet curable resin composition may contain, as a chemical-resisting agent, modified bisphenol A-type epoxy acrylate or bisphenol A-type epoxy modified acrylate in an amount of 20% by weight or less. When die content of the modified bisphenol A-type epoxy acrylate or bisphenol A-type epoxy modified acrylate exceeds 20% by weight, there is a possibility that the cured resin might crack due to the rigidity of the modified bisphenol A-type epoxy acrylate and bisphenol A-type epoxy modified acrylate.

The ultraviolet curable resin composition may contain, as an adjuvant or supplement for cross-linking reaction by UV irradiation to the (meth)acrylate having the isocyanuric acid ring, crosslinkable monomers individually or combining two or more kinds in an amount of 5% by weight or less. As the crosslinkable monomer, a monomer having two or more of unsaturated bonds of an equivalent reactive property may be used. The crosslinkable monomer is exemplified, for example, by a bifunctional(meth)acrylate monomer (meth) acrylate monomer having two (meth)acrylic groups), such as ethylene glycol di(meth)acrylate, propylene glycol di(meth) acrylate butylene glycol di(meth)acrylate, hexanediol di(meth)acrylate, tetraethylene glycol di(meth)acrylate, triethylene glycol di(meth)acrylate, and tripropylene glycol di(meth)acrylate. When the ultraviolet curable resin composition contains the crosslinkable monomer(s), molecular chains, each of which polymerization reaction is proceeding separately, can be cross-linked each other. This increases cross-linking points, thus improving hardness of the cured resin.

The resin composition related to the present disclosure contains the solid lubricant (solid sliding agent). The solid lubricant is preferably such that the transmissivity of ultraviolet rays is not affected when ultraviolet rays are radiated for caring or polymerizing the resin composition. From this viewpoint, it is used a polytetrafluoroethylene resin (hereinafter referred to as "PTFE" in an abbreviated a tanner, as appropriate) which is an organic white solid lubricant.

As the solid lubricant, one kind of PTFE may be used individually, or two kinds of PTFE having mutually different average particle diameters may be used in combination. When two kinds of PTFE with different average particle diameters are used, PTFE having a large average particle diameter (e.g., an average particle diameter of 75 to 180 μm, preferably an average particle diameter of 100 μm or greater) may be used in combination with PTFE having a small average particle diameter (e.g., an average particle diameter of 20 μm or less, preferably an average particle diameter of 1 to 15 μm).

PTFE can be contained in an amount of 30 to 80% by weight, especially in an amount of 40 to 70% by weight, with respect to the total amount of the resin composition. Usually, the resin a composition containing a large amount of PTFE is difficult to cure completely, because the light is shielded by PTFE. The resin composition related to the present disclosure, however, contains the polythiol compound that accelerates curing reaction as described above, and thus the resin composition related to the present disclosure may cure completely even when it contains a large amount of PTFE. Accordingly, the resin composition related to the present disclosure may contain PTFE in a larger amount than conventional ones. PTFE may be in any form such as a powder form or a fibrous form, and PTFE in any form may be used individually or in combination. The particles or fibers of PTFE powder may be surface-treated such that etching is performed on a surface of particles or fibers of the PTFE powder by using sodium naphthalene and then the surface is coated with epoxy modified acrylate. Such a surface treatment enhances the affinity for an acrylic resin produced from the (meth)acrylate having the isocyanuric acid ring and further strengthens the bond with the acrylic resin. Therefore, when the resin composition related to the present disclosure is used as the self-lubricating liner, the particles or fibers of PTFE can be prevented from separating from the self-lubricating liner at the time of sliding and thus t is possible to reduce the wear amount of the self-lubricating liner.

In the present disclosure, any other solid lubricant may be used together with PTFE. For example, the resin composition related to the present disclosure may contain melamine cyanurate or hexagonal boron nitride. Using the melamine cyanurate together with PTFE may reduce a friction coefficient after the resin composition is cured further than a case in which PTFE is used individually as the solid lubricant. In that case, the melamine cyanurate is desirably contained amount of 30% by weight or less with respect to the total amount of the resin composition. When the content of melamine cyanurate exceeds 30% by weight, although the friction coefficient of the self-lubricating liner becomes lower, the wear amount tends to increase. The melamine cyanurate has a cleavage tincture in which melamine molecules having six-membered ring structures and cyanuric acid molecules are held together by hydrogen-handing to be arranged planarly and each of the planes is stacked in layers by weak bonding. It is presumed that such a structure contributes to the solid lubricating property.

The resin composition related to the present disclosure may contain a dye, such as a polymerizable dye, water-based dye, or oil-based dye. For example, coloring the resin composition depending on the usage and/or kind thereof makes it possible to visually identify the usage and/or kind of the resin composition and a member manufactured using the resin composition. The polymerizable dye is superior in that it is less likely to dissolve in water or solvent than the oil-based dye and water-based dye. Thus, when the resin composition related to the present disclosure is used under a severe environment in which the resin composition is polluted with water or solvent, the polymerizable dye is preferably used. When conventional resin compositions contain the polymerizable dye, light is shielded by the polymerizable dye and thus the conventional resin compositions are difficult to cure completely. The resin composition related to the present disclosure, however, contains the polythiol compound accelerating curing reaction as described above. Thus, the resin composition related to the present disclosure can cure completely even when it contains the polymerizable dye. Those usable as the polymerizable dye include, for example, "RDW-R13", "RDW-R60", "RDW-G01", and "RDW-B01" produced by Wako Pure Chemical Industries, Ltd. Those usable as the water-based dye include, for example, "Aqueous and Glossy EXE" (color: red) and "Aqueous and Enamel Mini" (color: blue) produced by Nippe Home Products Co. Ltd. Those usable as the oil-based dye include, for example, "Oily and Glossy EXE" (color: red) and "Enamel" (color: green) produced by Nippe Home Products Co. Ltd. The resin composition related to the present disclosure may contain 1% by weight or less of the dye. The dye in an amount of 1% by weight or less provides its sufficient color, and the dye in an amount of 1% by weight or more could cause the resin composition to cure inadequately.

In order to start the polymerization reaction of the resin composition related to the present disclosure by ultraviolet rays, the resin composition related to the present disclosure may contain 0.01 to 5% by weight of a photopolymerization initiators Examples of the photopolymerization initiator include benzophenone, 4,4-bis(diethylamino) benzophenone, 2,4,6-trimethylbenzophenone, methylortho benzoyl benzoate 4-phenyl benzophenone, 2-t-butyl anthraquinone, 2-ethyl anthraquinone, 2-2-diethoxy acetophenone, 2-hydroxy-2-methyl-1-phenylpropane-1-one, benzyl dimethyl ketal, 1-hydroxy cyclohexyl-phenylketone, benzoin methyl ether, benzoin ethyl ether, benzoin isopropyl ether, benzoin isobutyl ether, 2-methyl-[4-(methylthio) phenyl]-2-morpholino-1-propanone, 2-benzyl-2-dimethylamino-1-(4-morpholino phenyl-1-butanone, 2,4-diethyl thioxanthone, isopropyl thioxanthone, diphenyl(2,4,6-trimethylbenzoyl) phosphine oxide, bis(2,6-dimethoxy benzoyl)-2,4,4-trimethylpentyl phosphine oxide, bis(2,4,6-trimethylbenzoyl) phenylphosphine oxide, 2-hydroxy-1-{4-[4-(2-hydroxy-2-methylpropionyl) benzyl] phenyl}-2-methylpropane-1-one, methyl benzoylformate, 1,2-octanedion, 1-[4-(phenylthio)phenyl]-, 2-(O-betzoyloxime), ethanone, 1-[9-ethyl-6-(2-methylbenzoyl)-9H-carbazole-3-yl]-, and 1-(O-acetyloxime). The above examples of the photopolymerization initiator ma be used individually or in combination. The photopolymerizatton initiator, however, is not limited to those.

In order to accelerate the polymerization reaction of the resin composition related to the present disclosure by heat, the resin composition related to the present disclosure may contain 0.01 to 5% by weight of an azo polymerization initiator that generates radicals by heat. When the resin composition related to the present disclosure contains the azo polymerization initiator, the azo polymerization initiator generates radicals by the reaction heat of polymerization reaction caused by ultraviolet irradiation, thus causing polymerization reaction of (meth)acrylate. Then, the polymerization reaction proceeds in the parts where ultraviolet rays do not reach, such as the inner portion of the resin composition, allowing the resin composition to cure completely. Examples of the azo polymerization initiator include dimethyl-2,2'-azobis(2-methyl propionate), dimethyl-1,1'-azobis(1-cyclohexanecarboxylate), 2,2'-azobis(2-methyl-N-2-propenylpropionamide), 2,2'-azobis(N-butyl-2-methylpropionamide), 1,1'-azobis(1-acetoxy-1-phenylethane), and dimethyl-2,2'-azobisisobutyrate. The above examples of the azo polymerization initiator may be used individually or in combination. The azo polymerization initiator, however, is not limited to those.

Glass fiber may be added to the resin composition related to the present disclosure to improve strength of the self-lubricating liner. Those usable as the glass fiber include circular cross-section glass fiber of which cross-sectional shape is circular and modified cross-section glass fiber of which cross-sectional shape is not circular. In addition to the glass fiber, the resin composition of the present disclosure may contain, as reinforcement fiber, inorganic fiber such as carbon fiber, aramid fiber, and potassium titanate whisker. The glass fiber is preferably added in an amount of 15% by weight or less with respect to the total amount of the resin composition. When the amount of addition of the glass fiber in the resin composition exceeds 15% by weight, the wear on a surface of a mating material is likely to be accelerated by the glass fiber which was cut at the time of cutting and/or grinding of the self-lubricating liner. This could compromise the advantages as the machinable liner. The glass fiber is suitably used, because transmissivity of ultraviolet rays is not reduced thereby.

The resin composition related to the present disclosure is desirably in a liquid form at room temperature. Accordingly, the resin composition can be applied on the sliding surface of the sliding member easily, and after the application, the resin composition can be cured by being irradiated with ultraviolet rays.

In addition to the above, it is possible to add various additives such as an antioxidant, a photostabilizer, a polymerization inhibitor, and a preservation stabilizer to the resin composition related to the present disclosure as needed.

In the resin composition related to the present disclosure, the ultraviolet curable resin in the liquid form is used as a base resin. Thus, the resin composition is easily mixed with the solid lubricant containing PTFE, and PTFE can be added to the resin composition related to the present disclosure in a high content (30 to 80% by weight). PTFE cannot be added to conventional ultraviolet curable resin compositions in such a high content. Therefore, it is possible to produce the self-lubricating liner having lower friction and less-wearing.

In the present disclosure, there is provided the sliding member with the self-lubricating liner by applying the ultraviolet curable resin composition containing: the (meth) acrylate compound having the isocyanuric acid ring represented by the above-described formula (1); the (meth) acrylate having the phosphoric acid ester group and/or the (meth)acrylate having the slime group; the polythiol compound; and PTFE as the solid lubricant on the sliding surface of the sliding member and then curing the ultraviolet curable resin composition by ultraviolet irradiation. Since the ultraviolet curable resin composition contains the polythiol compound and the like as the curing reaction accelerator, the self-lubricating liner using such an ultraviolet curable resin composition can have a thickness of 3 mm or more, as indicated in examples described later. When the ultraviolet curable resin composition further contains the compound having the glycidyl group or oxetane group and the acrylic group, the self-lubricating liner can have a thickness of 5 mm or more, as indicated in examples described later. The ultraviolet curable resin composition related to the present disclosure can have a high content of PTFE (30 to 80% by weight), and thus it is possible to produce the self-lubricating liner having low friction and high wear resistance. The ultraviolet curable resin composition related to the present disclosure contains (meth)acrylate having a functional group of phosphoester or silane, and thus the self-lubricating liner adheres to the sliding member firmly. The self-lubricating liner is a machinable liner which can be subjected to after-processing through grinding or cutting to obtain a desired size.

As described above, the ultraviolet curable resin composition related to the present disclosure contains the polythiol compound. This accelerates curing reaction of the curable resin composition. Thus, even when the resin composition has a large thickness, the inner portion of the resin composition can be cured by the ultraviolet irradiation. Accordingly, it is possible to form a lubricating liner with a large thickness by using the ultraviolet curable resin composition related to the present disclosure. Further, since the polythiol accelerates curing reaction, the ultraviolet curable resin composition related to the present disclosure may have a high content of PTFE. Furthermore, since the ultraviolet curable resin composition related to the present disclosure contains (meth)acrylate having a functional group of phosphoric acid ester or silane, the self-lubricating liner using the resin composition related to the present disclosure adheres to metal firmly.

EXAMPLES

A resin composition and a sliding member provided with a self-lubricating liner composed of the resin composition related to the present disclosure will be explained based on the following examples and comparative examples. However, the present disclosure is not limited to the following examples.

<Manufacture of Ultraviolet Curable Resin Composition>

In Examples 1 to 31 and Comparative Examples 1 to 5, components a1 to a3; b1, b2, b'1, b'2, c1 to c5; d1, d2; e1 to e6; f1, f2; g; h1, h2; i1 to i4; and j, as the following components A to J, respectively (wherein each of components b'1 and b'2 was comparative component of component B), were mixed in the composition ratios indicated in TABLE 1 to TABLE 3 to prepare to liquid resin compositions.

Component A: (meth)acrylate compound having isocyatutric acid ring
  Component a1; di-(2-acryloxyethyl) isocyanurate ("M-215" produced by TOAGOSEI CO., LTD.)
  Component a2: tris-(2-acryloxyethyl) isocyanurate ("FA-731AT" produced by Hitachi Chemical Co., Ltd.)
  Component a3: ε-caprolactone modified tris-(2-acryloxyethyl) isocyanurate ("A-9300-1CL" produced by Shin-Nakamura Chemical Co., Ltd)

Component B: (meth)acrylate having phosphoric acid ester group or silane group
  Component b1: ethylene glycol methacrylate phosphate
  Component b2: 3-acryloxypropyltrimethoxysilane
  Component B': Comparative component of component B
  Component b'1: pentaerythritol triacrylate hexamethylene diisocyanate urethane prepolymer ("UA-306H" produced by KYOEISHA CHEMICAL CO., LTD)
  Component b"2: bisphenol A-type epoxy acrylate ("EBE-CRYL 3700" produced by DAICEL-ALLNEX LTD.)

Component C: Polythiol compound
  Component c1: pentaerythritol tetrakis(3-mercapto butyrate)
  Component c2: 1,4-bis(3-mercaptobutyryloxy)butane
  Component c3: 1,3,5-tris(3-mercaptobutyryloxyethyl)-1,3,5-triazine-2,4,6(1H, 3H, 5H)-trione
  Component c4: trimethylolpropane tris(3-mercapto butyrate)
  Component c5: trimethylolethane tris(3-mercapto butyrate)

Component D: Compound having glycidyl group or oxetane group and acrylic group
  Component d1: glycidyl methacrylate
  Component d2: (3-ethyloxetane-3-yl) methylmethacrylate Component E: Dye
  Component e1: Polymerizable dye ("RDW-R13" produced by Wako Pure Chemical Industries, Ltd.)
  Component e2: Polymerizable dye ("RDW-R60" produced by Wako Pure Chemical Industries, Ltd.)
  Component e3: Polymerizable dye ("RDW-G01" produced by Wako Pure Chemical Industries, Ltd.)
  Component e4: Polymerizable dye ("RDW-B01" produced by Wako Pure Chemical Industries, Ltd.)
  Component e5: Oil-based dye ("Oily and Glossy EXE" color: red, produced by Nippe Home Products Co, Ltd.)
  Component e6: Water-based dye ("Aqueous and Glossy EXE" color: red, produced by Nippe Home Products Co. Ltd.)

Component F: Polymerization initiator
  Component f1: Photopolymerization initiator (2-hydroxy-2-methyl-1-phenylpropane-1-one, "DAROCURE 1173" produced by BASF Corporation)
  Component f2; Thermal polymerization initiator (2,2'-azobis(N-butyl-2-methylpropionamide), "VAm-110" produced by Wako Pure Chemical Industries, Ltd.)

Component G: (meth)acrylate having hydroxy group (reactive diluent)
  Component 2-hydroxyethyl methacrylate Component H: trifunctional or higher (meth)acrylate monomer.
  Component h1: trimethylolpropane triacrylate ("TMPTA" produced by DAICEL-ALLNEX LTD.)
  Component h2: dipentaerythritol polyacrylate "A-9550" produced by Shin-Nakamura Chemical Co. Ltd)

Constituent I: Solid lubricant
  Component i1: PTFE having an average particle diameter of 160 μm ("KT-40H" produced by KITAMURA LIMITED)
  Component i2: PTFE having an average particle diameter of 130 μm ("KT-60" produced by KITAMURA LIMITED)
  Component i3: PTFE having an average particle diameter of 12 μm ("KTL-610A" produced by KITAMURA LIMITED)
  Component i4. PTFE having an average particle diameter of 3.5 μm ("KTL-8FH" produced by KITAMURA LIMITED)

The average particle diameter of PTFE can be measured by a dry sieving testing method (JIS Z8815). When the average particle diameter is less than 45 μm, the average particle diameter can be measured by a laser diffraction/scattering method. In both the measuring methods, the average particle diameter indicates a particle diameter at integrated value of 50% in particle diameter distribution (median diameter in cumulative distribution).

Component J: Reinforcement fiber
  Component j: Glass fiber (average fiber length 65 μm×average diameter ø 11 μm, "SS05DE-413" produced by Nitto Boseki Co., Ltd.)

TABLE 1

| | Components | | | | | | | | | | | |
|---|---|---|---|---|---|---|---|---|---|---|---|---|
| | A | | | B | | B' | | C | | | | |
| | a1 | a2 | a3 | b1 | b2 | b'1 | b'2 | c1 | c2 | c3 | c4 | c5 |
| Example 1 | 6 | 14 | 15.9 | 5 | | | | 2 | | | | |
| Example 2 | 6 | 14 | 14 | | 1.9 | | | 2 | | | | |

TABLE 1-continued

| | Components | | | | | | | | | | | |
|---|---|---|---|---|---|---|---|---|---|---|---|---|
| | A | | | B | | B' | | C | | | | |
| | a1 | a2 | a3 | b1 | b2 | b'1 | b'2 | c1 | c2 | c3 | c4 | c5 |
| Example 3 | 6 | 14 | 15.9 | 1 | 1 | | | 2 | | | | |
| Example 4 | | | 34.1 | 1.3 | 0.5 | | | 1 | | | | |
| Example 5 | | | 28.1 | 1.3 | 0.5 | | | 1 | | | | |
| Example 6 | | | 34.1 | 1.3 | 0.5 | | | 1 | | | | |
| Example 7 | | | 28.1 | 1.3 | 0.5 | | | 1 | | | | |
| Example 8 | | | 38.1 | 1.3 | 0.5 | | | 1 | | | | |
| Example 9 | | | 37.1 | 1.3 | 0.5 | | | 1 | | | | |
| Example 10 | | | 33.1 | 1.3 | 0.5 | | | 1 | | | | |
| Example 11 | | | 33.1 | 1.3 | 0.5 | | | 1 | | | | |
| Example 12 | | | 38.1 | 1.3 | 0.5 | | | | 1 | | | |
| Example 13 | | | 38.6 | 1.3 | 0.5 | | | | | 0.5 | | |
| Example 14 | | | 37.1 | 1.3 | 0.5 | | | | | | 2 | |
| Example 15 | | | 36.1 | 1.3 | 0.5 | | | | | | | 3 |
| Example 16 | 3 | 7 | 10 | 5 | 5 | | | 1 | | | 1 | 1 |
| Example 17 | 4.8 | 11.2 | 5 | 1 | | | | | | 1.5 | | |
| Example 18 | 6 | 14 | 26 | 3 | 1 | | | 1 | 1 | 1 | 1 | 1 |
| Example 19 | 13.5 | 31.5 | | 3 | 2 | | | | | | 3 | |
| Example 20 | 13.5 | 31.5 | | 3 | | | | | | | 3 | |
| Example 21 | 6.4 | 15 | | 2 | 2 | | | 3 | | | | |
| Example 22 | 5.8 | 13.6 | | 3 | 1 | | | | 1 | | | |
| Example 23 | 9.5 | 22 | | 4 | 4 | | 5 | | | 2 | | |
| Example 24 | 11.6 | 27.1 | | 1 | 3 | | 10 | | | | 2 | |
| Example 25 | 11.3 | 26.3 | | 2 | | | | | | | | 3 |
| Example 26 | 12.5 | 29.2 | | | 2 | | | | | | | 3 |
| Example 27 | 6 | 14 | 25.945 | 2 | 3 | | | | 2 | 2 | | |
| Example 28 | 12 | 27.85 | | 3 | 3 | | | | 4 | | | |
| Example 29 | 10 | 24.85 | | 3 | 3 | | | | 4 | | | |
| Example 30 | 12 | 27.85 | | 3 | 3 | | | | 4 | | | |
| Example 31 | 12 | 27.85 | | 3 | 3 | | | | 4 | | | |
| Comparative Example 1 | 6 | 14 | 20.9 | | | | | 2 | | | | |
| Comparative Example 2 | 6 | 14 | 15.9 | | | 5 | | 2 | | | | |
| Comparative Example 3 | 6 | 14 | 15.9 | | | | 5 | 2 | | | | |
| Comparative Example 4 | | | 39.1 | 1.3 | 0.5 | | | | | | | |
| Comparative Example 5 | | | 38.1 | 1.3 | 0.5 | | | | | | | |

TABLE 2

| | Components | | | | | | | | | | |
|---|---|---|---|---|---|---|---|---|---|---|---|
| | D | | E | | | | | | F | | G |
| | d1 | d2 | e1 | e2 | e3 | e4 | e5 | e6 | f1 | f2 | g |
| Example 1 | | | | | | | | | 0.1 | | |
| Example 2 | | | | | | | | | 0.1 | | 5 |
| Example 3 | | | | | | | | | 0.1 | | 3 |
| Example 4 | 4 | | | | | | | | 0.1 | | 4 |
| Example 5 | 10 | | | | | | | | 0.1 | | 4 |
| Example 6 | | 4 | | | | | | | 0.1 | | 4 |
| Example 7 | | 10 | | | | | | | 0.1 | | 4 |
| Example 8 | | | | | | | | | 0.1 | | 4 |
| Example 9 | | | 1 | | | | | | 0.1 | | 4 |
| Example 10 | 4 | | 1 | | | | | | 0.1 | | 4 |
| Example 11 | | 4 | 1 | | | | | | 0.1 | | 4 |
| Example 12 | | | | | | | | | 0.1 | | 4 |
| Example 13 | | | | | | | | | 0.1 | | 4 |
| Example 14 | | | | | | | | | 0.1 | | 4 |
| Example 15 | | | | | | | | | 0.1 | | 4 |
| Example 16 | | | 1 | | | | | | 1 | | |
| Example 17 | | | | 0.5 | | | | | 3 | | |
| Example 18 | | | | | | 0.05 | | | 0.05 | | |
| Example 19 | | | | | | | 0.5 | | 1.5 | | |
| Example 20 | | | | | | | | 0.5 | 1.5 | | |
| Example 21 | | 0.5 | | | | | | | 0.1 | | 5 |
| Example 22 | | | 0.5 | | | | | | 0.1 | | 2 |
| Example 23 | | | | | | | | | 0.5 | | 3 |

TABLE 2-continued

| | Components | | | | | | | | | | |
|---|---|---|---|---|---|---|---|---|---|---|---|
| | D | | E | | | | | | F | | G |
| | d1 | d2 | e1 | e2 | e3 | e4 | e5 | e6 | f1 | f2 | g |
| Example 24 | | | | | | | | | 0.3 | | |
| Example 25 | | | | | | | | | 0.35 | 0.05 | |
| Example 26 | | | | | | | | | 0.3 | 3 | |
| Example 27 | | | 0.005 | | | | | | 0.05 | | |
| Example 28 | | | 0.1 | | | | | | 0.05 | | |
| Example 29 | | | 0.1 | | | | | | 0.05 | | |
| Example 30 | | | 0.1 | | | | | | 0.05 | | |
| Example 31 | | | 0.1 | | | | | | 0.05 | | |
| Comparative Example 1 | | | | | | | | | 0.1 | | |
| Comparative Example 2 | | | | | | | | | 0.1 | | |
| Comparative Example 3 | | | | | | | | | 0.1 | | |
| Comparative Example 4 | | | | | | | | | 0.1 | | 4 |
| Comparative Example 5 | | 1 | | | | | | | 0.1 | | 4 |

TABLE 3

| | Components | | | | | | |
|---|---|---|---|---|---|---|---|
| | H | | I | | | | J |
| | h1 | h2 | i1 | i2 | i3 | i4 | j |
| Example 1 | | | | 30 | 20 | | 7 |
| Example 2 | | | | 30 | 20 | | 7 |
| Example 3 | | | | 30 | 20 | | 7 |
| Example 4 | | | | 40 | | | 15 |
| Example 5 | | | | 40 | | | 15 |
| Example 6 | | | | 40 | | | 15 |
| Example 7 | | | | 40 | | | 15 |
| Example 8 | | | | 40 | | | 15 |
| Example 9 | | | | 40 | | | 15 |
| Example 10 | | | | 40 | | | 15 |
| Example 11 | | | | 40 | | | 15 |
| Example 12 | | | | 40 | | | 15 |
| Example 13 | | | | 40 | | | 15 |
| Example 14 | | | | 40 | | | 15 |
| Example 15 | | | | 40 | | | 15 |
| Example 16 | | | | 20 | 40 | | 5 |
| Example 17 | | | | 50 | 20 | | 3 |
| Example 18 | | | | 39.9 | | | 5 |
| Example 19 | | | | | 40 | | 5 |
| Example 20 | | | | 10 | 30 | | 7 |
| Example 21 | 6 | | | 25 | 25 | | 10 |
| Example 22 | | 13 | | 25 | 25 | | 10 |
| Example 23 | | | | 20 | 20 | | 10 |
| Example 24 | | | | 20 | 20 | | 5 |
| Example 25 | | | | 25 | 25 | | 7 |
| Example 26 | | | | 20 | 20 | | 10 |
| Example 27 | | | | 20 | 20 | | 5 |
| Example 28 | | | 40 | | | | 10 |
| Example 29 | | | 30 | | | 20 | 5 |
| Example 30 | | | | | 40 | | 10 |
| Example 31 | | | 20 | | | 20 | 10 |
| Comparative Example 1 | | | | 30 | 20 | | 7 |
| Comparative Example 2 | | | | 30 | 20 | | 7 |
| Comparative Example 3 | | | | 30 | 20 | | 7 |
| Comparative Example 4 | | | | 40 | | | 15 |
| Comparative Example 5 | | | | 40 | | | 15 |

<Manufacture of Self-Lubricating Liner>

Figure 1A:
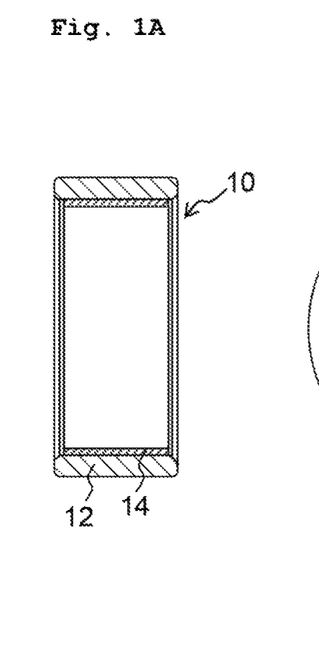
FIG. 1A is a longitudinal sectional view of a sleeve bearing related to the present disclosure cut along an axial direction of the sleeve beating.
Figure 1B:
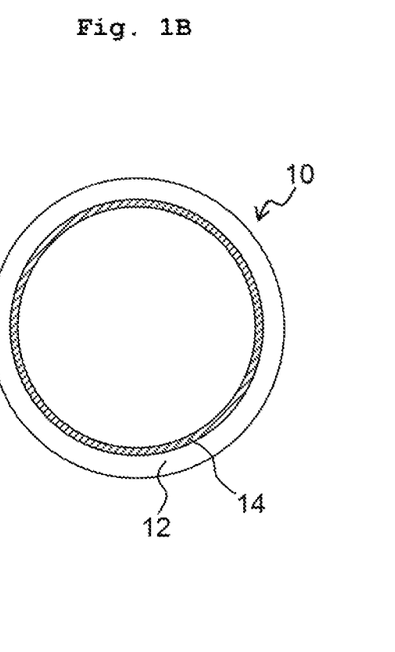
FIG. 1B is a lateral sectional view of the sleeve hewing cut along a direction perpendicular to the axis.

It was manufactured a cylindrical sleeve bearing (width (length in the axial direction) 12.7 mm, outer diameter 30.2 mm, inner diameter 24.9 mm) as shown in FIGS. 1A and 1B by using a material obtained by subjecting SUS630 stainless steel to heat treatment under H1150 condition. The resin composition prepared in each of Examples 1 to 31 and Comparative Examples 1 to 5 was uniformly applied on an inner circumferential surface of this sleeve bearing by using a dispenser. Subsequently, the applied resin composition was irradiated with ultraviolet rays for one minute to cure the resin composition, so that a machinable liner was formed in the inner circumferential surface of the sleeve bearing. Next, this machinable liner was subjected to cutting and grinding to have a liner thickness of 0.25 mm, and the sleeve was finished to an inner diameter of 25.4 mm.

1. Adhesion Strength

The adhesion strength of the resin composition of each of Examples 1 to 3 and Comparative Examples 1 to 3 was measured in accordance with JIS K 6850. TABLE 4 indicates adhesion strength values thereof.

TABLE 4

| | Adhesion strength/MPa |
|---|---|
| Example 1 | 17.7 |
| Example 2 | 15 |
| Example 3 | 16.3 |
| Comparative Example 1 | 2.4 |
| Comparative Example 2 | 5.2 |
| Comparative Example 3 | 3.9 |

As indicated in TABLE 4, the resin composition of each of Examples 1 to 3 containing, as the component B, any or both of the components b1 and b2 had the adhesion strength higher than that of the resin composition of each of Comparative Examples 1 to 3 containing no component B.

2. Thick Film Photo-Curing Test

The resin composition of each of Examples 4 to 15 and Comparative Examples 4 and 5 was poured into a cylindrical container made of polypropylene and having an inner diameter of 10 mm and a depth of 30 mm. The liquid surface of the resin composition was irradiated with ultraviolet rays at an integrated light intensity of 3000 mJ/cm², thus curing the resin composition. The resin composition was removed from the cylindrical container and the length (thickness) of the cured resin composition was measured. TABLE 5 indicates results thereof.

TABLE 5

|  | Length of cured resin composition/mm |
|---|---|
| Example 4 | 6.8 |
| Example 5 | 7.8 |
| Example 6 | 6.4 |
| Example 7 | 7.5 |
| Example 8 | 4.2 |
| Example 9 | 3.5 |
| Example 10 | 5.4 |
| Example 11 | 5.1 |
| Example 12 | 4.1 |
| Example 13 | 3.6 |
| Example 14 | 4.3 |
| Example 15 | 4.6 |
| Comparative Example 4 | 2.6 |
| Comparative Example 4 | 1.0 |

As indicated in TABLE 5, the length of the resin composition of each of Examples 8 and 12 to 15 containing the component C (polythiol compound) was longer than the length of the resin composition of Comparative Example 4 containing no component C. This revealed that containing the component C made the film thickness of the cured resin composition large and all the components c1 to c5 provided the effect of increasing the film thickness of the cured resin composition. Further, the length of the resin composition of each of Examples 4 to 7 containing the component D as the compound having the glycidyl group or oxetane group and the acrylic group was longer than the length of the resin composition of Example 8 containing no component D. This revealed that containing the component D made the film thickness of the cured resin composition large.

The length of the resin composition of Example 9 containing the component E as the dye was shorter than the length of the resin composition of Example 8 containing no component E, and the length of the resin composition of Comparative Example 5 containing the component E as the dye was shorter than the length of the resin composition Comparative Example 4 containing no component E. This revealed that light was shielded by the dye, thus causing the film thickness of the cured resin composition to apt to be small. Meanwhile, the length of the resin composition of Example 9 containing the components C and E was longer than the length of the resin composition of Comparative Example 4 containing no components C and E. This revealed that the component C compensated for the reduction of film thickness of the cured resin composition caused by the component E. Further, the length of the resin composition of each of Examples 10 and 11 containing the components C, D, and E was longer than the length of the resin composition of Example 9 containing components C and E and no component D. This revealed that, as with the case containing no component E, the case containing the component E was also able to obtain the effect of increasing the film thickness of the cured resin composition by virtue of the component D.

3. Colorant Elution Test

The resin composition of each of Examples 9, 16 to 20, and 27 was irradiated with ultraviolet rays, thus curing the resin composition. The cured resin composition was immersed in IPA, a rust preventive oil ("ANTITRUST TERAMI SC" produced by JX Nippon Oil & Energy Corporation), pure water, and nitric acid (50 wt %) and kept for one week. In order to examine whether the colorant (dye) was eluted, the absorbance of IPA, rust preventive oil, pure water, and nitric acid in which the resin composition was immersed, at a wavelength of 350 to 700 nm was measured by a spectrophotometer ("V-530" produced by JASCO). When the absorbance exceeded 0.05 in a measurement area, it was determined that the colorant was eluted from the cured resin composition. TABLE 6 indicates results thereof, TABLE 6, "o" indicates that no dye was eluted and "x" indicates that the dye was elute.

TABLE 6

|  | Solvents | | | |
|---|---|---|---|---|
|  | IPA | Rust preventive oil | Pure water | Nitric acid |
| Example 9 | o | o | o | o |
| Example 16 | o | o | o | o |
| Example 17 | o | o | o | o |
| Example 18 | o | o | o | o |
| Example 19 | x | x | o | o |
| Example 20 | o | o | x | x |
| Example 27 | o | o | o | o |

As indicated in TABLE 6, regarding the resin composition of each of Examples 9, 16 to 18, and 27 containing the components e1 to e4 as the polymerizable dye, no colorant was eluted in all the solvents. Meanwhile, retarding the resin composition of Example 19 containing the component e5 as the oil-based dye, the colorant was elated in the IPA and rust preventive oil. Regarding the resin composition of Example 20 containing the component e6 as the water-based dye, the colorant was eluted in the pure water and nitric acid. As understood from those results, the polymerizable dye was superior to the oil-based dye and water-based dye in that no colorant was eluted in the solvents.

In the examples, the resin composition related to the present disclosure was applied to the sleeve bearing with the shape as shown in FIGS. 1A and 1B. However, the application of the present disclosure is not limited to that shape, and it is possible to apply the resin composition related to the present disclosure to sliding members having a variety of shapes and structures.

<Spherical Bearing>

Figure 2:
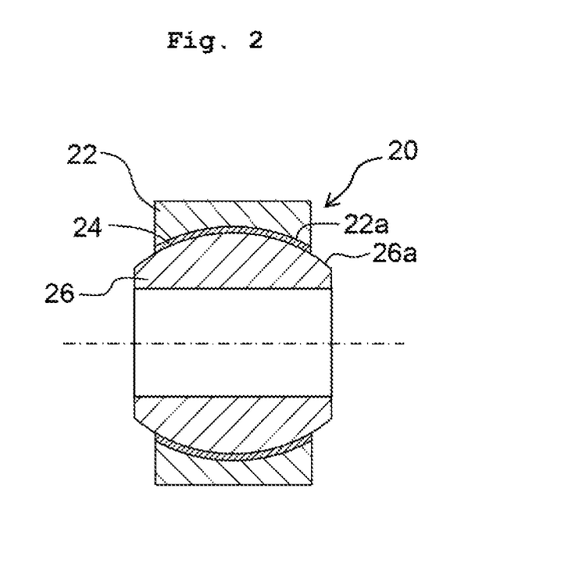
FIG. 2 is a cross-sectional view of a structure of a spherical beating with a self-lubricating liner made from a resin composition related to the present disclosure.

As shown in FIG. 2, a spherical bearing 20 includes an outer race (outer ring) 22 having a concave spherical inner-circumferential surface 22a, an inner race (inner ring) 26 having a convex spherical outer-circumferential surface 26a, and a machinable liner 24 formed between the inner circumferential surface 22a and the outer circumferential surface 26a. The thickness of the liner may be, for example, about 0.25 mm.

<Rod End Spherical Bearing>

Figure 3A:
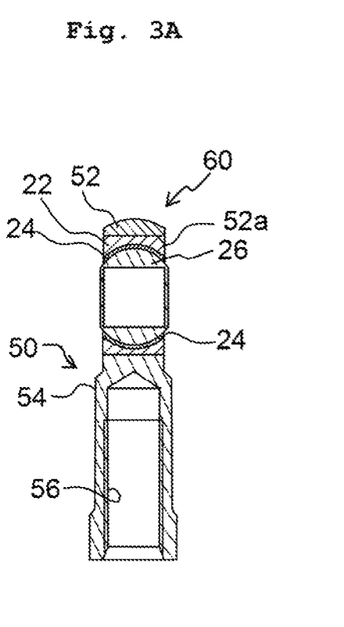
FIG. 3A is a longitudinal sectional view of a rod end spherical beating into which the spherical bearing related to the present disclosure is incorporated and FIG. 3B is a lateral sectional view of the same.
Figure 3B:
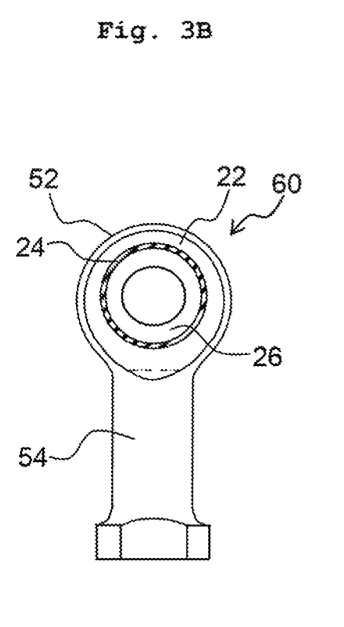

FIGS. 3A and 3B each show an exemplary rod end spherical bearing 60 in which the spherical bearing 20 is assembled into a rod end body 50. The rod end body 50 includes a head portion 52 having a through hole 52a into which the spherical bearing 20 is inserted, and a shaft portion 54 provided with a female or male thread 56. The shaft portion 54 is a substantially cylindrical portion extending from the head portion 52 in a radial direction of the through hole 52a. After inserting the spherical bearing 20 in the through hole 52a, the spherical bearing 20 is fixed to the rod end body 50 by swaging a V-shaped groove (not shown) formed at the edge of the through bole 52a.

<Reamer Bolt>

Figure 4:
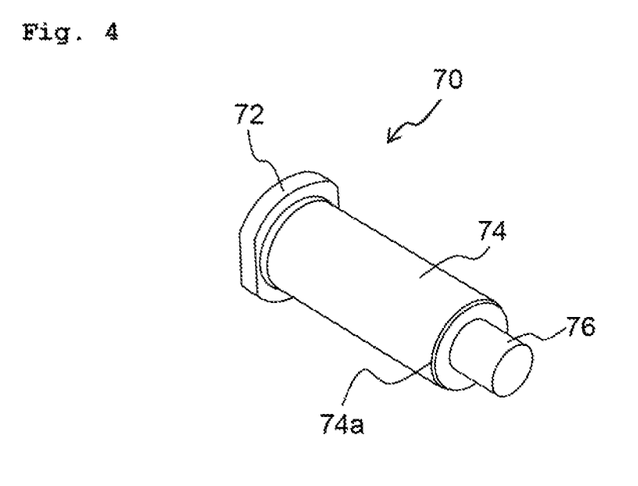
FIG. 4 shows an outer appearance of a reamer bolt with a self-lubricating liner, which is formed on a shaft surface of the reamer bolt and is made from the resin composition related to the present disclosure.

A reamer bolt 70 as shown in FIG. 4 includes a main body portion composed of a head portion 72, a shaft portion 74 having a large diameter and a male thread portion 76 having a small diameter, and a machinable liner 74a provided on the outer circumference of the shaft portion 74. The machinable liner 74a is formed by uniformly applying and curing a resin composition prepared in any of the examples in a similar manner as that described in the examples. The main body portion of the reamer bolt 70 can be made of SUS630 stainless steel, for example. The thickness of the machinable liner 74a may be in a range of about 0.25 to 0.5 mm.

The reamer bolt 70 is used in critical connection portions transmitting high torque, such as a propeller shaft of vessels or ships, a flight control surface of aircraft, and a connecting rod of automobile engines. The reamer bolt 70 used in such important connection portions is required to be fitted to a bolt hole with high precision without any internal clearance. Therefore, the shaft portion 74 of the reamer bolt 70 is finished with high precision, but even so, it is advantageous to be able to perform the size adjustment of the bolt at the time of assembly. Since the reamer bolt according to the present disclosure includes the machinable liner 74a, a user is capable of easily adjusting the size of outer diameter of the shaft portion even after curing of the resin. Further, since the reamer bolt related to the present disclosure includes the self-lubricating machinable liner 74a on the shaft portion 74, galling and the like do not occur when the bolt is inserted or removed at the time of assembly or disassembly. This advantage results in a reamer bolt 70 with a long, service life.

Although the present disclosure has been explained by the embodiments and examples, the present invention is not limited to those and can be substantiated in various embodiments and aspects within the scope of the claims. For example, in the above embodiments, the self-lubricating liner is formed on the inner circumferential surface of the outer race of the spherical bearing and the rod end spherical bearing. The self-lubricating liner, however, nay be formed on the outer circumferential surface of the inner race. Further, although the explanation has been made by citing the spherical bearing, the rod end spherical bearing, and the reamer bolt as examples of the sliding member, the present invention is not limited to those and can be applied to any sliding member including the self-lubricating liner. Especially, although the explanation has been made in the above embodiments and examples by citing the sliding member used for rotary motion of the member or part, the sliding member related to the present invention includes not only that for the rotary motion but also a sliding member used for sliding motion such as translational motion (linear motion), oscillating motion, and any combination thereof in any direction.

As described above, the lubricating liner with a large thickness can be formed by using the ultraviolet curable resin composition related to the present disclosure. Since the ultraviolet curable resin composition related to the present disclosure can have a high content of PTFE, it is possible to form the lubricating liner having lower friction and higher wear resistance. Further, the lubricating liner formed by using the ultraviolet curable resin composition related to the present disclosure adheres to metal firmly. The self-lubricating liner manufactured as described above can be formed in various sliding members including sliding bearings such as a sleeve bearing and a spherical bearing. The self-lubricating liner formed by the ultraviolet curable resin composition related to the present disclosure can be subjected to cutting, grinding, and the like, which allows an end-user to perform posterior processing, such as the line-adjustment of inner diameter size of the bearing when installing the shaft in the bearing. Therefore, the resin composition related to the present disclosure and the sliding member provided with the self-lubricating liner made from the resin composition related to the present disclosure are useful in wide fields such s vessels, aircraft, automobiles, electronic products, and home electric appliances.

What is claimed is:

1. An ultraviolet curable resin composition for a self-lubricating liner, comprising:
    a (meth)acrylate compound having an isocyanuric acid ring represented by formula (1):

where X is a group that contains an acryloyl group and is composed only of C, H, and O, and
Y and Z are groups each composed only of C, H, and O;
    at least one of (meth)acrylate having a phosphoric acid ester group and (meth)acrylate having a silane group;
    a polythiol compound; and
    a polytetrafluoroethylene resin as a solid lubricant.

2. The ultraviolet curable resin composition according to claim 1, further comprising a compound having a glycidyl group or oxetane group and an acrylic group.

3. The ultraviolet curable resin composition according to claim 2, wherein the compound having the glycidyl group or oxetane group and the acrylic group is glycidyl methacrylate or (3-ethyloxetane-3-yl) methyl methacrylate.

4. The ultraviolet curable resin composition according to claim 1, further comprising a dye.

5. The ultraviolet curable resin composition according to claim 1, further comprising (meth)acrylate having a hydroxy group.

6. The ultraviolet curable resin composition according to claim 1, wherein the (meth)acrylate compound having the isocyanuric acid ring is any of di-(2-(meth) acryloxyethyl) isocyanurate, tris-(2-(meth)acryloxyethyl) isocyanurate, and ε-caprolactone modified tris-(2-acryloxyethyl) isocyanurate or a mixture obtained by combining two or more kinds of them.

7. The ultraviolet curable resin composition according to claim 1, wherein the polythiol compound is any of pentaerythritol tetrakis(3-mercapto butyrate), 1,4-bis(3-mercaptobutyryloxy)butane, 1,3,5-tris(3-mercaptobutyryloxyethyl)-1,3,5-triazine-2,4,6(1H, 3H, 5H)-trione, trimethylolpropane tris(3-mercapto butyrate), and trimethylolethane tris(3-mercapto butyrate) or a mixture obtained by combining two or more kinds of them.

8. The ultraviolet curable resin composition according to claim 1, wherein the (meth)acrylate having the phosphoric acid ester group is ethylene glycol methacrylate phosphate, and the (meth)acrylate having the silane group is 3-acryloxypropyltrimethoxysilane.

9. The ultraviolet curable resin composition according to claim 1, wherein the ultraviolet curable resin composition contains 30 to 80% by weight of the polytetrafluoroethylene resin.

10. The ultraviolet curable resin composition according to claim 1, further comprising any of pentaerythritol triacrylate, pentaerythritol tetraacrylate, dipentaerythritol penta(meth)acrylate, dipentaerythritol hexa(meth)acrylate, dipentaerythritol polyacrylate, and trimethylolpropane tri(meth)acrylate or a mixture obtained by combining two or more kinds of them.

11. The ultraviolet curable resin composition according to claim 1, further comprising modified bisphenol A-type epoxy acrylate or bisphenol A-type epoxy modified acrylate.

12. The ultraviolet curable resin composition according to claim 1, further comprising any of benzophenone, 4,4-bis (diethylamino) benzophenone, 2,4,6-trimethylbenzophenone, methylortho benzoyl benzoate, 4-phenyl benzophenone, 2-t-butyl anthraquinone, 2-ethyl anthraquinone, 2-2-diethoxy acetophenone, 2-hydroxy-2-methyl-1-phenylpropane-1-one, benzyl dimethyl ketal, 1-hydroxy cyclohexyl-phenylketone, benzoin methyl ether, benzoin ethyl ether, benzoin isopropyl ether, benzoin isobutyl ether, 2-methyl-[4-(methylthio) phenyl]-2-morpholino-1-propanone, 2-benzyl-2-dimethylamino-1-(4-morpholino phenyl)-1-butanone, 2,4-diethyl thioxanthone, isopropyl thioxanthone, diphenyl(2,4,6-trimethylbenzoyl)phosphine oxide, bis(2,6-dimethoxy benzoyl)-2,4,4-trimethylpentyl phosphine oxide, bis(2,4,6-trimethylbenzoyl) phenylphosphine oxide, 2-hydroxy-1-{4-[4-(2-hydroxy-2-methylpropionyl) benzyl] phenyl}-2-methylpropane-1-one, methyl benzoylformate, 1,2-octanedion, 1-[4-(phenylthio)phenyl]-, 2-(O-benzoyloxime), ethanone, 1-[9-ethyl-6-(2-methylbenzoyl)-9H-carbazole-3-yl]-, and 1-(O-acetyloxime) or a mixture obtained by combining two or more kinds of them.

13. The ultraviolet curable resin composition according to claim 1, further comprising any of dimethyl-2,2'-azobis(2-methyl propionate), dimethyl-1,1'-azobis(1-cyclohexanecarboxylate), 2,2'-azobis(2-methyl-N-2-propenylpropionamide), 2,2'-azobis(N-butyl-2-methylpropionamide), 1,1'-azobis(1-acetoxy-1-phenylethane), and dimethyl-2,2'-azobisisobutyrate or a mixture obtained by combining two or more kinds of them.

14. A sliding member comprising a self-lubricating liner that is formed on a sliding surface of the sliding member and is made of the ultraviolet curable resin composition as defined in claim 1.

15. The sliding member according to claim 14, wherein the sliding member is a sliding bearing.

16. The sliding member according to claim 15, wherein the sliding bearing is a spherical bearing.

17. The sliding member according to claim 14, wherein the sliding member is a bolt comprising a head portion, a shaft portion, a thread portion, and the self-lubricating liner formed on an outer circumferential surface of the shaft portion that is the sliding surface.

18. The ultraviolet curable resin composition according to claim 1, wherein the ultraviolet curable resin composition comprises:
    15 to 50% by weight of the (meth)acrylate compound having the isocyanuric acid ring,
    1 to 10% by weight of the at least one (meth)acrylate having the phosphoric acid ester group and (meth)acrylate having the silane group,
    0.5 to 5% by weight of the polythiol compound, and
    30 to 80% by weight of the polytetrafluoroethylene resin.

19. The ultraviolet curable resin composition according to claim 18, wherein:
    the (meth)acrylate compound having the isocyanuric acid ring is any of di-(2-(meth) acryloxyethyl) isocyanurate, tris-(2-(meth)acryloxyethyl) isocyanurate, and ε-caprolactone modified tris-(2-acryloxyethyl) isocyanurate or a mixture obtained by combining two or more kinds of them,
    the (meth)acrylate having the phosphoric acid ester group is ethylene glycol methacrylate phosphate, and the (meth)acrylate having the silane group is 3-acryloxypropyltrimethoxysilane, and
    the polythiol compound is any of pentaerythritol tetrakis (3-mercapto butyrate), 1,4-bis(3-mercaptobutyryloxy) butane, 1,3,5-tris(3-mercaptobutyryloxyethyl)-1,3,5-triazine-2,4,6(1H, 3H, 5H)-trione, trimethylolpropane tris(3-mercapto butyrate), and trimethylolethane tris(3-mercapto butyrate) or a mixture obtained by combining two or more kinds of them.

20. The ultraviolet curable resin composition according to claim 19, further comprising:
    0.01 to 5% by weight of a photopolymerization initiator; and
    15% by weight or less of reinforcement fibers.

* * * * *